Dec. 24, 1968  R. W. DRAKE  3,417,735

TWIN SPOUT MINK WATERING CUP

Filed Aug. 5, 1966

Ralph W. Drake
INVENTOR.

United States Patent Office 3,417,735
Patented Dec. 24, 1968

3,417,735
TWIN SPOUT MINK WATERING CUP
Ralph W. Drake, Rte. 5, Box 1025,
Bremerton, Wash. 98310
Filed Aug. 5, 1966, Ser. No. 570,561
3 Claims. (Cl. 119—18)

ABSTRACT OF THE DISCLOSURE

The front vertical wall of an openwork wire mink cage has prescribed spout inlet openings to the right and left, respectively, of an interior partition dividing the enclosed space into separate pens. This wall serves to accommodate a watering pan having twin spouts which are properly aligned with and project through the inlet holes into the coacting pens. Suitable attaching hooks, with or without optional bracket means, are preferably used to mount the pan on the cage.

---

This invention relates to certain new and useful improvements in an animal cage characterized, generally speaking, by an openwork wire-type cage having an internal partition providing divided pens and which are primarily, but not necessarily, designed and adapted for confinement of mink and pertains, more specifically, to an improved pan-like watering cup which is suspended from the front wall of the cage.

More specifically, the concept herein under advisement has to do with a furring pen waterer such as, for example, a mink waterer. Two component parts or units are involved, namely, an openwork cage and the combination therewith of a watering cup which is unique and different in that it is equipped with dual or twin spouts.

In carrying out the principles of the overall inventive concept the cage is constructed of customary wire or equivalent netting such as that which has been adapted for use in the construction of mink rearing cages. Insofar as the underlying principle of the invention is concerned the encaging space is divided into at least two compartments or pens. This is accomplished by incorporating an imperforate vertical partion or wall in the space and thus separating the same into the desired individual or independent pens. Instead of using an individual cup for each pen a dual or twin spout watering cup is utililized.

To the ends desired the front wall of the cage is provided to the left and right respectively of the divider or partition with a suitably constructed spout inlet opening or hole. The cage is thus adapted for the attachment thereto of the twin spout watering cup.

Stated more explicitly, the cup comprises a horizontally elongated tray or receptacle which has a bottom wall circumscribed by an upstanding rim wall. The rim wall is characterized by a forward or outer longitudinal generally straight wall, an opposed substantially parallel shorter rearward or inward wall, the individual spouts being provided at the respective ends of the inward wall and, as a matter of fact, at the juncture of the ends of the inward wall and adjacent end portions of the transverse or end walls of the overall cup. It follows that the spouts, which are properly concavo-convex and suitably dished, protrude or project through the respective openings to the left and right of the partition. Moreover, the inward wall has its upper edge provided with suitable tabs which are bent to form hook-like clips which are engaged over coacting wires of the front wall to thus position and retain the novel twin spout cup in place.

These togehter with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
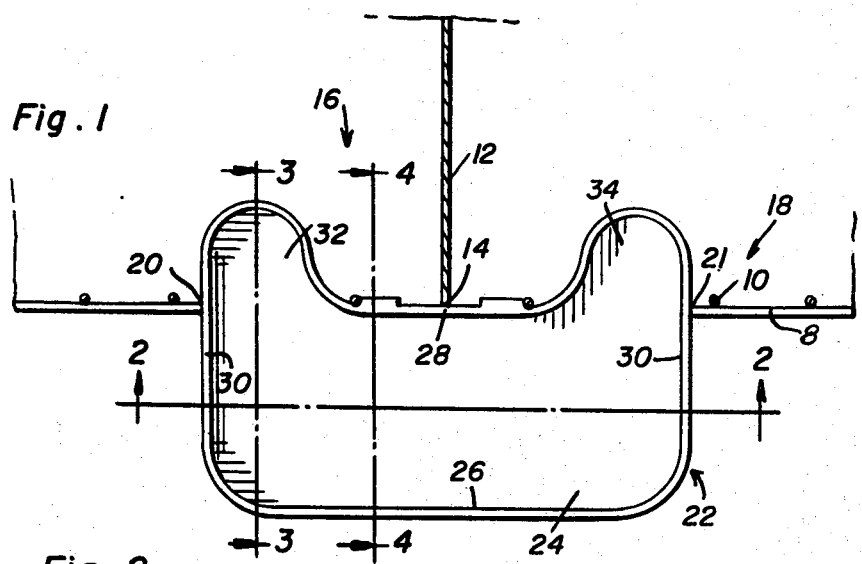
FIG. 1 is a top plan view showing a fragmentary portion of a partitioned or divided mink cage, the left and right spout inlet openings and the two spouts projecting therethrough, the spouts being provided at the respective end portions of the forwardly projecting watering cup.
Figure 3:
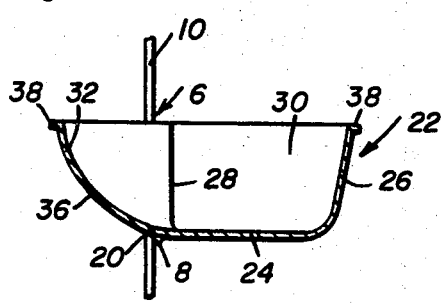
Figure 4:
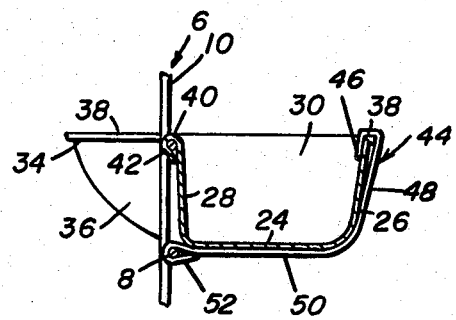

And FIGS. 3 and 4 are sections on the section lines 3—3 and 4—4, respectively, of FIG. 1, looking in the direction of the indicating arrows with the harnessing bracket removed.

Figure 2:
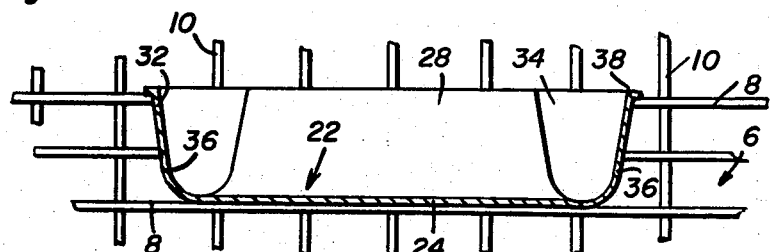
FIG. 2 is a view in section taken on the plane of the section line 2—2 of FIG. 1.

Only the essential components of the cage are here shown. This is to say the open work or fabricated wire front vertical wall of the cage is denoted generally at 6 and embodies horizontal wires 8 and associated properly crossed and connected vertical wires 10. The aforementioned interior imperforate wall or divider is denoted at 12 and the forward or outer vertical edge 14 is fitted against the interior of the front wall. This wall or partition trainsforms the mink enclosing space into individual left and right pens or compartments 16 and 18. The inlet opening to the left of the partition (FIG. 1) is denoted by the numeral 20 and the corresponding inlet opening to the right is denoted at 21. The sheet material pan-like or tray-like watering cup is denoted by the numeral 22 and has a general rectangular body portion which, more specifically, comprises a substantially flat bottom 24 encompassed by a substantially straight elongated outer or front wall 26, an opposed substantially straight but shorter inward or rearward wall 28 and end walls 30 connecting the inner and outer lengthwise walls 26 and 28. The overall length of the receptacle portion of the watering cup is such that it bridges the divider or partition 12 in the manner shown in FIG. 1. The dual or twin spouts at the respective end portions of the cup are the same in construction, the one at the left being denoted (FIG. 1) by the numeral 32 and the one at the right by the numeral 34. Each spout has a concavo-convex or suitably dished body portion as shown at 36 in FIG. 3. Also each spout is generally substantialy semi-circular in plan and is of a prescribed dimension to permit it to be projected through and beyond the opening 20 or 21 which is provided therefor to the left and right of the divider 12 as shown in FIG. 1. Incidentally, the upper edge portions of all of the walls are provided with lip-like flanges 38. Also as shown in FIGS. 1 and 2 the upper edge portion 40 (FIG. 4) is provided with bendable down bent tabs 42 which are hooked or clipped in place on the coacting wire to in this manner support the wall 28 exteriorly of the cage wall with the spouts located in the respective pens or compartments 16 and 18.

While it is believed that the attaching and retaining down-bent tabs 42 will, under ordinary circumstances, function to adequately attach and maintain the dual spout cup or pan in place it is within the purview of the concept to provide an optional stabilizing and harnessing bracket such as is shown at 44 in FIG. 4. This bracket (shown only in FIG. 4) comprises a metal strap of appropriate width and which is made of bendable stock and whose upper end 46 is clipped over the coacting flanged portion 38 in the manner shown. There is a vertical limb 48 and a horizontal limb 50, the latter underlying the bottom 24 and having a terminal hook 52 which is bent over and around the cage wire 8 in the manner shown. As stated, this bracket is an optional feature and is to be construed accordingly.

It is submitted that the dual or twin spout watering cup herein shown and described, considered in conjunction with the partitioned cage provides a structural adaptation

What is claimed as new is as follows:

1. For exteriorly supported use on the front vertical openwork wire wall of a mink cage wherein said front wall is provided with spout inlet openings to the left and right, respectively, of an interior pen dividing partition, a horizontally elongated pan-like receptacle wholly open at its top and constituting a mink watering cup, said receptacle embodying a generally flat bottom wall marginally provided with encompassing elongated inward and outward upstanding rim walls joined at their respective ends by intervening transverse end walls, and individual but duplicate mink drinking spouts projecting laterally beyond said inward wall at the juncture of said end walls and left and right end portions, respectively, of said inward rim wall, said spouts being adapted to extend into individual mink pens by way of the aforementioned left and right inlet openings, a median portion of the upper marginal edge of said inward rim wall residing in abutting contact with the exterior of said front wall and being provided with individual bendable attaching tabs located between said spouts and clipped to an adjacent front wall wire in a manner to hang and support said cup, each spout being substantially semicircular in plan and characterized by a concavo-convex body portion having an upper marginal edge provided with an encompassing outstanding lip-forming flange.

2. The mink watering cup according to claim 1 and, in combination, a stabilizing and reinforcing bracket, said bracket embodying a horizontal limb underlying said bottom wall and terminating at a free end thereof with a bendable terminal which is adapted to be connected with a coacting wire component of the aforementioned cage, and further embodying a vertical component provided at its upper end with an inwardly and downwardly bent hook-shaped clip which is operatively connected with the upper marginal edge of the aforementioned upstanding rim wall.

3. In combination, an openwork wire mink cage having a vertical front wall and an internal vertical partition dividing the mink encaging space of said cage into separate and independent mink pens, and a twin spout watering cup comprising horizontally elongated pan-like receptacle having elongated longitudinal inward and outward rim walls joined by transverse end walls, said inward wall having individual spouts spaced apart and situated at the respective transverse ends of said cup and so located that one spout projects inwardly through a first front wall spout inlet opening to the left side of said partition, and the other spout projects also inwardly and through a second front wall spout inlet opening to the right side of said partition, the upper marginal edge of said inward wall residing in abutting contact with the exterior of said front wall and provided with bendable attaching tabs which are clipped to an adjacent front wall wire in a manner to hang and support the cup on said wire.

References Cited

UNITED STATES PATENTS

| | | | |
|---|---|---|---|
| 2,066,264 | 12/1936 | Fisher | 119—53 |
| 171,309 | 12/1875 | Osborn et al. | 119—18 |
| 2,224,211 | 12/1940 | Austin | 119—18 |
| 2,309,458 | 1/1943 | Ingraham | 119—18 X |
| 2,471,527 | 5/1949 | Jonas | 119—18 |

HUGH R. CHAMBLEE, *Primary Examiner.*

U.S. Cl. X.R.

119—61, 72